Jan. 12, 1960   A. FERRI   2,920,843
TURBO-JET BOOST AUGMENTER
Filed June 18, 1956
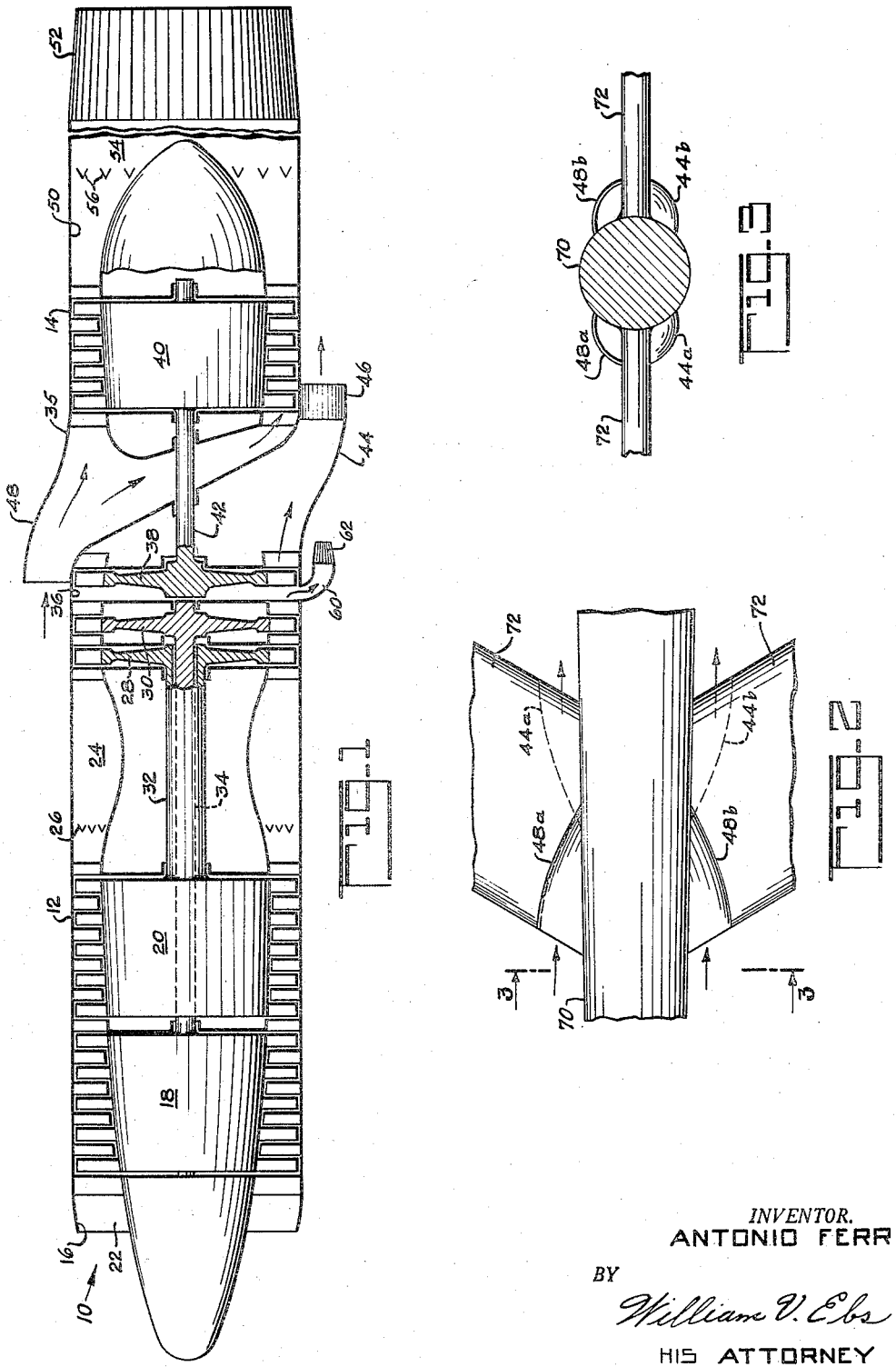
INVENTOR.
ANTONIO FERRI
BY
William V. Ebs
HIS ATTORNEY

United States Patent Office 2,920,843
Patented Jan. 12, 1960

2,920,843

TURBO-JET BOOST AUGMENTER

Antonio Ferri, Rockville Centre, N.Y., assignor to Curtiss-Wright Corporation, a corporation of Delaware Application June 18, 1956, Serial No. 591,972

3 Claims. (Cl. 244—15)

This invention relates to jet engines for aircraft and is particularly directed to the addition of a thrust augmentor to such an engine for increasing thrust output.

An object of the present invention comprises the provision of a novel jet engine thrust augmentor which does not materially increase the overall diameter of the engine and can be added to existing jet engines without any change in the basic engine components. A further object of the invention comprises the provision of a power plant comprising a jet engine with a novel thrust augmentor such that the power plant is flexible from the standpoint of installation in an aircraft and such that the power plant is capable of being installed in an aircraft so as to increase the aircraft lift.

Other objects of the invention will become apparent upon reading the annexed detailed description in connection with the drawing in which:

Fig. 1 is a schematic sectional view of a power plant embodying the invention;

Fig. 2 is a schematic view of the power plant of Fig. 1 installed in an aircraft; and Fig. 3 is a front view taken along line 3—3 of Fig. 2.

Referring to Fig. 1 of the drawing, an aircraft power plant 10 is shown as comprising a two-spool turbo jet engine unit 12 and a thrust augmentor unit 14. As will be apparent however the invention is not limited to the combination of the thrust augmentor with this specific type of gas turbine engine and instead can be used with any turbo-jet engine. As illustrated, the turbo-jet engine 12 comprises a duct-like housing 16 within which are mounted the basic components of a turbo-jet engine, namely a compressor assembly, combustion apparatus and turbine assembly. The turbo-jet compressor assembly comprises two co-axial serially-disposed and independently rotatable, compressor rotors 18 and 20. The low pressure compressor rotor 18 receives air from the engine air inlet 22 and supplies compressed air to the high pressure compressor rotor 20 which further compresses the air and supplies it to the combustion chamber 24 of the combustion apparatus. Fuel is supplied to the combustion chamber 24 through burners 26 for combustion with said air and the combustion gases drive two co-axial serially-disposed and independently rotatable turbine rotors 28 and 30. Said combustion gases first discharge between the blades of the high pressure turbine rotor 28 for co-action therewith to drive said rotor. Said gases then discharge between the blades of the lower pressure turbine rotor 30 for co-action therewith to drive said rotor 30. The high pressure turbine 28 of the turbo-jet engine 12 is drivably connected to the high pressure compressor 20 by a shaft 32 and the low pressure turbine 30 of said engine 12 is drivably connected to the low pressure compressor 18 by a shaft 34.

As described, the turbo-jet engine 12 is a conventional two-spool turbo-jet engine. The thrust augmentor 14 has a housing 35 with a passage 36 at its forward end into which the exhaust gases of the engine 12 discharges. The thrust augmentor also includes a turbine 38 mounted within the housing 35 adjacent to its forward end so that the gases owing through the passage 36 from the turbine 30 discharge between the blades of the turbine 38 for co-action therewith to drive said turbine. The thrust augmentor unit 14 also includes an air compressor or air blower member 40 drivably connected to the turbine 38 by a shaft 42. The blower member is mounted within the housing 35 and is rearwardly spaced from the turbine 38. As herein used the term "blower" is intended to be broad enough to include a compressor, fan or other rotatable means for increasing the pressure and/or velocity of a fluid. In addition, the unit 14 includes one or more side exhaust ducts 44 each terminating in a rearwardly directed exhaust nozzle 46 through which the exhaust gases discharge into the surrounding atmosphere to provide the power plant with forward propulsive thrust only one such duct being illustrated in Fig. 1. As illustrated in Fig. 1, the exhaust duct 44 projects laterally from the housing 35 between the turbine 38 and blower 40. In addition the augmentor unit 14 has one or more side air inlets 48 with forwardly directed air inlet openings through which air is supplied to the compressor or blower 40, only one such inlet duct being shown in Fig. 1. As illustrated in Fig. 1, the air inlet 48 projects laterally from the housing 35 between the turbine 38 and blower 40 opposite the exhaust duct 44. From the blower 40 the air is discharged rearwardly through an exhaust passage 50 and thence through an exhaust nozzle 52 into the surrounding atmosphere to add to the forward propulsive thrust of the power plant. The passage 50 may also include a combustion chamber 54 having fuel burners 56 for supplying fuel to said chamber for combustion with air discharged therethrough by the blower 40 to further increase the propulsive thrust.

From the above description it is apparent that the three turbines 28, 30 and 38 are disposed in series with the turbine 28 being the high pressure or first stage turbine, the turbine 30 being the intermediate pressure or second stage turbine and the turbine 38 being the low pressure or third stage turbine.

In general, where the basic turbo-jet engine is a two-spool engine, such as the engine 12, it will be necessary or desirable to provide a by-pass exhaust passageway 60 for a portion of the combustion gases between the turbines 30 and 38. Thus the exhaust by-pass passageway 60 communicates with the duct 36 between the turbines 30 and 38 and extends laterally from the housing 35. The by-pass passageway 60 has a rearwardly directed variable area exhaust nozzle 62 at its discharge end for controlling the by-pass flow therethrough. No such by-pass passageway is necessary where the basic turbo-jet engine is a single spool gas turbine engine although it may also be used in such a power plant.

The exhaust nozzle 52 also preferably if of the variable area type for controlling the exhaust flow therethrough. For example, if the burners 56 are provided the nozzle 52 may have two positions, the one for when the burners 56 are shut off and the other, a wider open position, for when the burners 56 are operating. The nozzle 46 also preferably is of the variable area type for controlling the speed of the turbine 38.

With the power plant 10 as described, the thrust augmentor 14 does not add materially to the frontal area of the power plant. In addition the axial spacing and locations of the basic turbo-jet unit 12 and augmenter 14 may be varied to meet the aircraft installation problems. In fact if the power plant 10 is mounted in or adjacent to an aircraft wing, the side exhaust nozzle or nozzles 46 and the side inlet or inlets 48 may be disposed so as to increase the lift of said wing. Such an installation is illustrated in Figs. 2 and 3.

In Figs. 2 and 3 the power plant is mounted within an aircraft fuselage 70 having an aircraft wing 72 extending from opposite sides. Two forwardly directed side air inlets 48a and 48b are provided. The air inlets 48a and 48b correspond to the single air inlet 48 illustrated in Fig. 1 and hence are for supplying air to the blower 40. Two rearwardly directed exhaust ducts 44a and 44b are also provided. The ducts 44a and 44b correspond to the single exhaust duct 44 illustrated in Fig. 1 and hence are for rearwardly discharging the exhaust of the turbine 38. The power plant of Figs. 2 and 3 is otherwise like that of Fig. 1. For simplicity details within the fuselage including the engine are not shown in Figs. 2 and 3.

The two inlets 48a and 48b are disposed on the upper side of the wing 72 adjacent to its leading edge and on opposite sides of the fuselage 70. Each of these inlets projects laterally from the fuselage 70 and wing 72 to a maximum extent at its forward end so that during flight the air flowing over the outside of the inlet forms a low pressure area over the wing downstream of said air inlet whereby the presence of the air inlets 48a and 48b on the upper side of the wing adds to the lift of said wing.

The two exhaust ducts 44a and 44b are disposed on the under side of the wing 72 adjacent to its trailing edge and on opposite sides of the fuselage 70. Each of these exhaust ducts projects laterally from the fuselage 70 and wing 72 to a maximum extent adjacent to its rear end whereby, during flight, the air flowing over the outside of the duct 44 forms a high pressure area under the wing upstream of said exhaust duct. Accordingly, the presence of the exhaust ducts 44a and 44b on the under side of the wing also adds to the lift of said wing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A jet propulsion power plant comprising a two-spool gas turbine having first and second stage air compressors, burner apparatus and first and second stage turbines with the second stage turbine being drivably connected to the first stage compressor and the first stage turbine being drivably connected to the second stage compressor; and a thrust augmenter having a third stage turbine driven by gases discharging from said second stage turbine, an air blower drivably connected to said third stage turbine, an air inlet for supplying air to said blower, a discharge passageway for said blower having a rearwardly directed nozzle, a discharge passageway for the gases exhausting from said third stage turbine having a rearwardly directed nozzle, and a by-pass discharge passageway having a rearwardly directed thrust nozzle for discharging a portion of the gases exhausting from said second stage turbine directly into the surrounding atmosphere.

2. A jet propulsion power plant comprising a gas turbine engine having a compressor assembly, burner apparatus supplied with compressed air by said compressor assembly, and a turbine assembly drivably connected to said compressor assembly and arranged to be driven by combustion gases from said burner apparatus; and a thrust augmenter co-axially disposed at the rear of said gas turbine engine and having an outer diameter which is substantially no greater than the outer diameter of said engine; said thrust augmenter comprising a turbine rotor arranged to be driven by exhaust gases from said engine, an air blower drivably connected to said turbine rotor and spaced axially to the rear of said turbine rotor, an air inlet passageway having a forwardly directed air inlet for supplying air to said blower, an exhaust passageway for said blower having a rearwardly directed exhaust nozzle so that exhaust gases discharging through said nozzle provide forward propulsive thrust, and an exhaust duct for gases exhausting from said turbine rotor and having a rearwardly directed exhaust nozzle so that the exhaust gases discharging therethrough add to said propulsive thrust.

3. In an aircraft having a wing and a jet propulsion power plant mounted on said aircraft adjacent to said wing and comprising a gas turbine engine, the combination with said wing and said engine of a thrust augmenter, said augmenter having a transverse cross-section approximately congruent with that of said engine and being of approximately the same diameter as said engine and being disposed coaxial with said engine and downstream therefrom, said augmenter having a turbine rotor disposed in the exhaust of said engine and drivable thereby, a blower coaxial with said rotor and connected in a driven relation thereto, at least one air inlet duct supplying air to said blower and having a forwardly-directed opening, said inlet duct projecting into the airstream adjacent to the upper surface of said wing with said projection being maximum at the forward end of said inlet duct and diminishing toward the rearward end and providing a low-pressure region in said airstream over the wing downstream of said forward end, at least one exhaust thrust duct for said turbine having a rearwardly-directed opening, said exhaust duct projecting into the airstream adjacent to the under surface of said wing with said projection being maximum at the rearward end of said exhaust duct and diminishing toward the forward end and providing a high-pressure region in said airstream under the wing upstream of said rearward end, and an exhaust passageway for said blower having a rearwardly-directed thrust nozzle.

References Cited in the file of this patent

UNITED STATES PATENTS

| 2,388,973 | Hofgren | Nov. 13, 1945 |
| 2,447,100 | Stalker | Aug. 17, 1948 |
| 2,523,938 | Berliner | Sept. 26, 1950 |
| 2,529,973 | Sedille et al. | Nov. 14, 1950 |
| 2,563,270 | Price | Aug. 7, 1951 |
| 2,571,586 | Lane | Oct. 16, 1951 |
| 2,696,079 | Kappus | Dec. 7, 1954 |
| 2,821,350 | Smurik | Jan. 28, 1958 |

FOREIGN PATENTS

| 586,572 | Great Britain | Mar. 24, 1947 |